US010686791B1

(12) United States Patent
Balmakhtar et al.

(10) Patent No.: US 10,686,791 B1
(45) Date of Patent: *Jun. 16, 2020

(54) SECURE CLOUD COMPUTING FRAMEWORK

(71) Applicant: Sprint Communications Company L.P., Overland Park, KS (US)

(72) Inventors: Marouane Balmakhtar, Alexandria, VA (US); Carl J. Persson, Olathe, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,487

(22) Filed: Feb. 5, 2019

Related U.S. Application Data

(63) Continuation of application No. 15/415,753, filed on Jan. 25, 2017, now Pat. No. 10,243,959.

(51) Int. Cl.
*H04L 29/06* (2006.01)
*H04L 29/08* (2006.01)

(52) U.S. Cl.
CPC .......... *H04L 63/10* (2013.01); *H04L 63/0428* (2013.01); *H04L 63/08* (2013.01); *H04L 67/10* (2013.01)

(58) Field of Classification Search
None
See application file for complete search history.

(56) References Cited

U.S. PATENT DOCUMENTS

| 10,243,959 | B1  |   | 3/2019 | Balmakhtar et al. |            |
|------------|-----|---|--------|-------------------|------------|
| 2015/0063166 | A1 | * | 3/2015 | Sif ............... | G06F 9/45558 370/254 |
| 2016/0065618 | A1 | * | 3/2016 | Banerjee ........... | H04L 63/20 726/1 |
| 2016/0234250 | A1 | * | 8/2016 | Ashley ............. | H04L 63/105 |
| 2017/0177873 | A1 | * | 6/2017 | Raghuram .......... | G06F 21/53 |
| 2018/0121221 | A1 | * | 5/2018 | Ahuja .............. | G06F 9/45558 |
| 2018/0234459 | A1 | * | 8/2018 | Kung ............... | H04L 63/20 |

OTHER PUBLICATIONS

Notice of Allowance dated Nov. 13, 2018, U.S. Appl. No. 15/415,753, filed Jan. 25, 2017.

* cited by examiner

*Primary Examiner* — Shin-Hon (Eric) Chen

(57) ABSTRACT

A cloud computing system. The system comprises a network, a data store communicatively coupled to the network, a plurality of compute nodes, at least some of the compute nodes comprising a cloud computing framework agent coupled to an agent gate keeper, where the cloud computing framework agent communicates with the network via the agent gate keeper, an image management component coupled to an image management gate keeper, where the image management component manages images that execute in the compute instances on the compute nodes and communicates with the network via the image management gate keeper, and a security engine coupled to the network that receives a request to initiate an image on a compute instance, analyzes the image to determine an authentication metric, and when the authentication metric matches a validated authentication value, sends the image to the image management component for loading and instantiating in the compute instance.

16 Claims, 3 Drawing Sheets

SECURE CLOUD COMPUTING FRAMEWORK

CROSS-REFERENCE TO RELATED APPLICATIONS

This application claims priority as a continuation application to U.S. patent application Ser. No. 15/415,753 filed on Jan. 25, 2017, entitled "Secure Cloud Computing Network," by Marouane Balmakhtar, et al., which is herein incorporated by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The OpenStack software may be used to configure, control, coordinate, and manage cloud computing resources. The OpenStack architecture may comprise a controller facility referred to as Horizon, an identity management facility referred to as Keystone, a switching and routing facility referred to as Neutron, an executable image management facility referred to as Glance, a block storage management facility referred to as Cinder, and thin agents referred to as Nova agents that run on each compute node to provide a handle for monitoring and managing the cloud computing resources. A plurality of compute resources can be configured, controlled, coordinated, and managed by a single set of OpenStack components, up to a limit of compute resources. As the cloud computing extends beyond the limits of OpenStack, separate sets of OpenStack components operate independently in separate OpenStack clusters.

SUMMARY

In an embodiment, a cloud computing system is disclosed. The cloud computing system comprises a communication network, a security data store communicatively coupled to the communication network, a plurality of compute nodes, at least some of the compute nodes comprising a cloud computing framework agent coupled to an agent gate keeper component, where the cloud computing framework agent communicates with the communication network via the agent gate keeper component, a cloud computing framework controller component coupled to a controller gate keeper component, where the cloud computing framework controller component controls compute instances instantiated on the compute nodes and communicates with the communication network via the controller gate keeper component, and a cloud computing framework executable image management component coupled to a executable image management gate keeper component, where the executable image management component manages images that execute in the compute instances on the compute nodes and communicates with the communication network via the executable image management gate keeper component. The cloud computing system further comprises a security engine coupled to the communication network that receives messages from the controller gate keeper containing logs of activity of the cloud computing framework controller component, receives messages from the executable image management gate keeper component containing logs of activity of the cloud computing framework executable image management component, receives messages from the agent gate keepers containing logs of activity of the cloud computing framework agents, stores the messages in the security data store, analyzes the messages, and sends a security command to one of the controller gate keeper, the executable image management gate keeper component, or one of the agent gate keepers to take a security action.

In another embodiment, a cloud computing system is disclosed. The cloud computing system comprises a communication network, a security data store communicatively coupled to the communication network, a plurality of compute nodes, at least some of the compute nodes comprising a cloud computing framework agent coupled to an agent gate keeper component, where the cloud computing framework agent communicates with the communication network via the agent gate keeper component, a cloud computing framework controller component coupled to a controller gate keeper component, where the cloud computing framework controller component controls compute instances instantiated on the compute nodes and communicates with the communication network via the controller gate keeper component, and a cloud computing framework executable image management component coupled to an executable image management gate keeper component, where the cloud computing framework executable image management component manages images that execute in the compute instances on the compute nodes and communicates with the communication network via the executable image management gate keeper component. The cloud computing system further comprises a security engine coupled to the communication network that receives a request from the controller gate keeper to initiate an image on a compute instance, analyzes the image to determine an authentication metric, compares the authentication metric to a validated authentication value, and when the authentication metric matches the validated authentication value, sends the image to the cloud computing framework executable image management component for loading and instantiating in the compute instance.

In yet another embodiment, a cloud computing system is disclosed. The cloud computing system comprises a communication network, a cross-cluster security data store coupled to the communication network and comprising security rules related to cyber threat signatures detected within the cloud computing system, and an orchestrator coupled to the communication network that receives a security rule via the communication network, stores the security rule in the cross-cluster security data store, and transmits the security rule via the communication network to at least some of a plurality of cloud computing clusters, and the plurality of cloud computing clusters. Each cloud computing cluster comprises a security data store communicatively coupled to the communication network, a plurality of compute nodes, at least some of the compute nodes comprising a cloud computing framework agent coupled to an agent gate keeper component, where the cloud computing framework agent communicates with the communication network via the agent gate keeper component, and a cloud computing framework controller component coupled to a controller gate keeper component, where the cloud computing framework controller component controls compute instances instantiated on the compute nodes and communicates with the communication network via the controller gate keeper component. Each cloud computing cluster further comprises a cloud computing framework executable image management component coupled to a executable image management gate keeper component, where the cloud computing framework executable image management component manages images that execute in the compute instances on the compute nodes and communicates with the communication network via the executable image management gate keeper component and a security engine coupled to the communication network that receives messages from the controller gate keeper containing logs of activity of the cloud computing framework controller component, receives messages from the executable image management gate keeper component containing logs of activity of the cloud computing framework executable image management component, receives messages from the agent gate keepers containing logs of activity of the cloud computing framework agents, stores the messages in the security data store, analyzes the messages, creates a security rule based on the analysis, sends the security rule to the orchestrator via the communication network, and sends a security command based on applying the security rule to the received messages to one of the controller gate keeper, the executable image management gate keeper component, or one of the agent gate keepers to take a security action.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
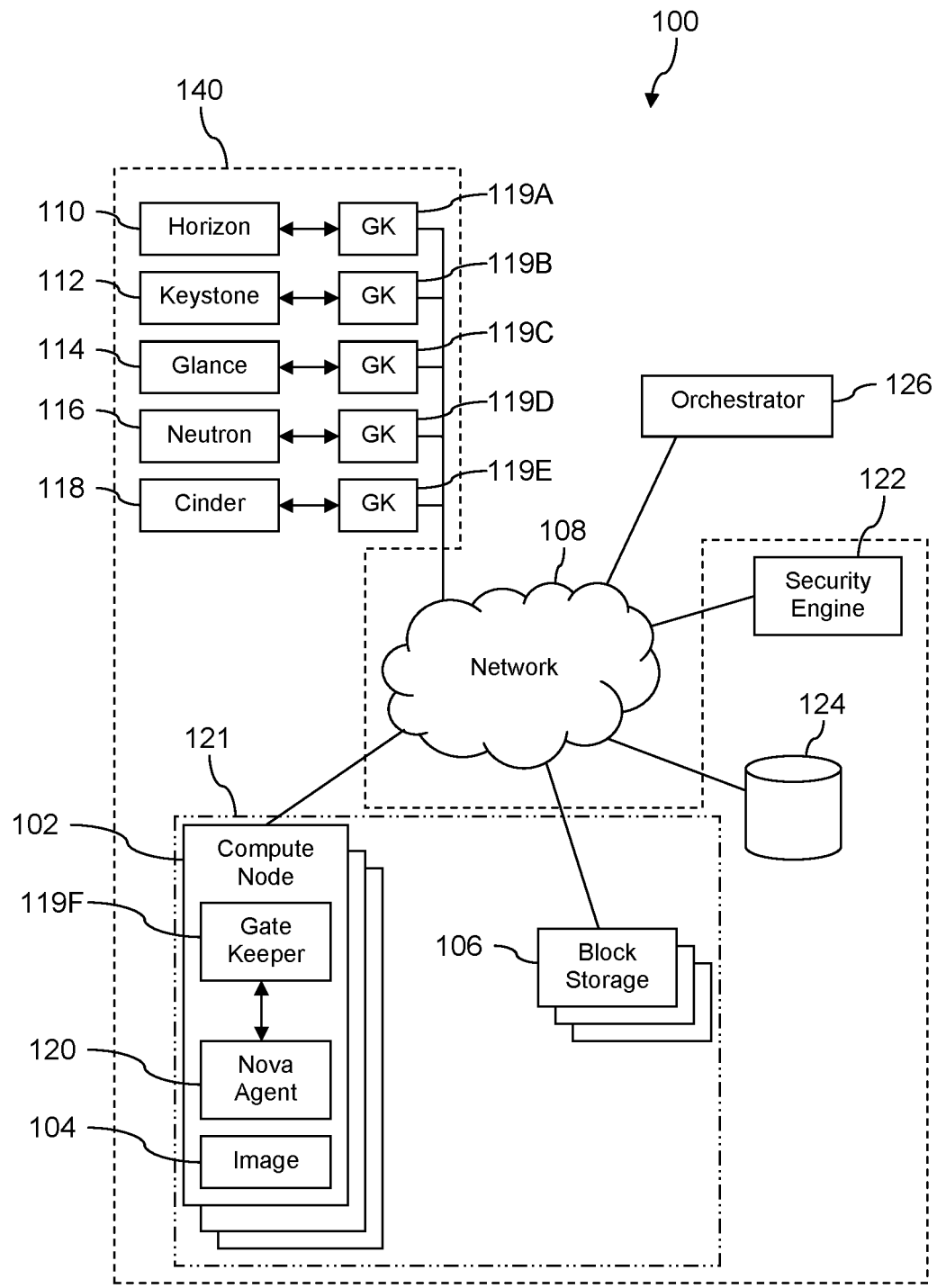
FIG. 1 is a block diagram of a computing environment according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The OpenStack software may be used to configure, control, coordinate, and manage a cloud computing environment. Cloud computing involves launching execution images in virtual machines executing on top of computer systems. The underlying computer system is abstracted away by intervening software entities or layers such as a hypervisor. Block storage is likewise abstracted as a virtual resource for the execution images executing in the virtual machines. The processing that is desired to be performed by end users or enterprises is provided by the execution images. The underlying cloud computing system resources used by the execution images are expanded or contracted, as needed, to satisfy dynamic demands of the execution images. In an embodiment, OpenStack software is utilized to provide this cloud computing environment to the execution images.

In other embodiments, a different cloud computing management software framework (e.g., different from OpenStack software) may be deployed that provides configuration, control, coordination, and management software to provide this environment to execution images. An alternative cloud computing management framework may comprise a controller component, an identity management component, an executable image management component, a communication component (that provides processing for switching and routing), and a block storage management component. The alternative cloud computing management software framework may additionally comprise a plurality of clients or agents that execute on cloud computing computers to provide monitoring and control functionality on the cloud computing computers, for example in response or under control of the controller component. The alternative cloud computing management framework's controller, identity management, image management, communication, and block storage management components may execute on one or more computer systems that do not provide cloud computing resources (e.g., do not execute images that provide processing desired by end users or enterprises). The clients or agents, by contrast, execute on cloud computing computers that execute images on behalf of end users or enterprises.

The actions that can be performed using the OpenStack software are very powerful. The present disclosure teaches a security framework that improves the computer security of the OpenStack software and reduces the vulnerability of cloud computing systems relying on OpenStack to being attacked by malware or external hackers. While the focus in the discussion will be on the OpenStack software, it is appreciated that the teachings herein may be applicable to other cloud computing software systems.

The security framework comprises a security bus that provides secure communication among OpenStack components. This security bus is implemented, at least in part, by a gate keeper that is placed in the communication link between OpenStack components and a communication network. For example, an OpenStack command sent by the Horizon OpenStack component to a Nova agent OpenStack component in a compute node associated with an executing image would be intercepted by a first gate keeper associated with the Horizon component before it entered the communication network. The first gate keeper would log the command to a security data store and evaluate the command based on security rules configured into the first gate keeper by one of a framework security engine or an orchestrator component. The Horizon component would be unaware of the first gate keeper. Said in other words, the Horizon component would not be designed or reconfigured to communicate with the first gate keeper, and the first gate keeper would be "transparent" to the Horizon component. If the command is deemed authorized and/or not a security risk, the first gate keeper forwards the command via the communication network to a second gate keeper associated with the Nova Agent component in the compute node. The second gate keeper would log the received command to the security data store and evaluate the command based on security rules configured into the second gate keeper. If the command is deemed authorized and/or not a security risk, the second gate keeper forwards the command on to the Nova Agent. From the perspective of the Horizon component and the Nova Agent component, they are communicating directly with each other via the communication network.

The communication between gate keepers associated with the OpenStack components may be encrypted to prevent spoofing of OpenStack messages and to prevent sniffing of the content of OpenStack messages by any malware that may infiltrate the OpenStack system. It is understood that the security bus of the security framework is an abstraction and is implemented by an overlay on the network communications of a conventional OpenStack and cloud computing environment, where the abstraction is provided by the gate keepers.

The security framework may provide for authentication of an executable image before it is launched to be executed on a compute node. This check may also be performed by an OpenStack component, for example by the Glance OpenStack component, but to provide for the eventuality that the Glance OpenStack component may have been compromised by malware, the Glance gate keeper component of the security framework may itself authenticate the image that the Glance OpenStack component seeks to instantiate on a compute node. For example, the Glance gate keeper may calculate a check sum or other validation algorithm and compare the result to a known good value of check sum. If the comparison succeeds, the Glance gate keeper allows the instantiation of the image on the subject compute node mediated by the Glance OpenStack component to proceed. If the comparison fails, the Glance gate keeper prevents the instantiation of the image and further reports the failed authentication event to the security engine for possible further action. Alternatively, this additional validation of the executable image may be performed by the security engine of the security framework rather than the Glance gate keeper.

The security engine of the framework analyzes the OpenStack messages and determines security rules to be configured into the different gate keepers, for example different rule sets for gate keepers supporting OpenStack components having different roles in the OpenStack system. The security engine may perform statistical analysis of OpenStack messages to determine norms of OpenStack message traffic and to determine patterns of OpenStack message traffic. The security engine can then automatically generate security rules, based on defined or inferred levels of deviations from the norms, and promulgate the security rules to the appropriate gate keepers for implementation. The security engine can also analyze OpenStack messages stored in the security data store to identify cyberattack events and to determine a signature of the cyberattack. The security engine may then define one or more rules based on identifying the signature of the cyberattack in the future and taking action to parry the cyberattack.

The OpenStack environment supports a cloud computing environment with a limited span of compute nodes. For example, in an embodiment, an OpenStack cluster may be limited to a maximum of 100 compute nodes, a maximum of 150 compute nodes, a maximum of 200 compute nodes, or some other maximum number of compute nodes. If more computing resources are needed, the conventional approach is to establish two or more independent OpenStack clusters which do not directly coordinate or collaborate with each other. Any such coordination may be provided external to OpenStack facilities. The present disclosure teaches sharing both data from the security data store across OpenStack cluster boundaries as well as sharing security rules across OpenStack cluster boundaries. An orchestrator component can communicate to security engines in each of the OpenStack clusters to receive shared OpenStack messages and to receive security rules determined by the security engines.

The orchestrator may deem that one or more security rules determined by first security engine associated with a first OpenStack cluster should be shared or promulgated to one or more security engines in one or more other OpenStack clusters, whereby the security learning of the first security engine can benefit the other independent OpenStack clusters. One way to think about this is that every OpenStack cluster does not have to learn the hard way how to defend itself from a new cyber threat. The first OpenStack cluster to suffer a new cyberattack may be able to determine the appropriate parrying security rule and share that, via the orchestrator, with the other OpenStack clusters before they themselves suffer the new cyberattack. In some contexts, a security rule that is suitable for sharing across multiple OpenStack clusters may be referred to as a general security rule.

A cloud computing framework, different from the OpenStack environment, may likewise be constrained to a maximum number of compute nodes. The secure cloud computing framework can also collaborate over several independent clusters of cloud computing frameworks, in a manner similar to that described above with reference to OpenStack cluster security collaboration across OpenStack clusters.

The secure OpenStack framework is compatible with OpenStack components that do not have an associated gate keeper coupled to them. For example, a gate keeper that receives an OpenStack message directly from an OpenStack component, rather than from a gate keeper component associated with the subject OpenStack component, may accept and process the OpenStack message notwithstanding that it does not come from a gate keeper and notwithstanding that it is not encrypted. This may allow interoperation of OpenStack components that are already integrated into the secure OpenStack framework with other OpenStack components that have not been so integrated. The gate keeper component may still process the OpenStack message received from the OpenStack component according to the security rules configured into it by the security engine.

Turning now to FIG. 1, a computing system 100 is described. In an embodiment, the system 100 comprises one or more compute nodes 102 executing one or more instance of an executable image 104 using block storage 106. A same executable image 104 may execute on two or more compute nodes 102; different compute nodes 102 may execute different executable images 104; and different executable images 104 may execute on the same compute node 102. The compute node(s) 102 communicate with each other and with the block storage 106 via a communication network 108. The network 108 may be one or more private networks, one or more public networks, or a combination thereof. The executable image 104 may be any executable collection of computer programs or computer scripts. The executable image 104 may provide some processing for an enterprise or other organization, for example performing virtualized network functions (VNF) in a wireless communication service provider's network infrastructure, billing functions, mobile communication device authorization, data processing, and other functions. The compute nodes 102 and the block storage 106 may be considered to provide an underlying cloud computing environment 121. The underlying cloud computing environment 121 may be said to provide the useful services associated with the executable images 104—services that an end user or organization is interested in, services that an organization may pay fees to enjoy, for example.

A secure OpenStack (OPS) framework 140 may be said to be overlaid over the cloud computing environment 121 and provide functionality to initiate, monitor, control, coordinate, and manage the cloud computing environment 121 and to instantiate executable images 104 on compute nodes 102. The secure OPS framework 140 comprises one or more of a Horizon OPS component 110, a Keystone OPS component 112, a Glance OPS component 114, a Neutron OPS component 116, a Cinder OPS component 118, and one or more Nova agent OPS components 120 on the compute nodes 102 (e.g., one Nova agent 120 on each compute node 102). The Horizon OPS component 110, the Keystone OPS component 112, the Glance OPS component 114, the Neutron OPS component 116, the Cinder OPS component 118, and a security engine 122 may execute on a common computer system, for example on a same server computer, or on different computer systems, for example on two or more different server computers.

It is understood that the teachings of the present disclosure may be applied to cloud computing frameworks other than the OPS framework. In such alternative cloud computing frameworks, the Horizon OPS component 110 may be substituted by a cloud computing framework controller component, the Keystone OPS component 112 may be substituted by a cloud computing framework identity management component, the Glance OPS component 114 may be substituted by a cloud computing framework executable image management component, the Neutron OPS component 116 may be substituted by a cloud computing framework communication component (providing routing and switching), the Cinder OPS component 118 may be substituted by a cloud computing framework block storage management component, and the one or more Nova agent OPS components 120 may be substituted by one or more cloud computing framework agents. In an alternative embodiment, the secure OPS framework 140 may be referred to as a secure cloud computing framework. The secure cloud computing framework comprises the cloud computing framework controller component, the cloud computing framework identity management component, the cloud computing framework executable image management component, the cloud computing framework communication component, the cloud computing framework block storage management component, and the cloud computing framework agent(s).

The secure OPS framework 140 further comprises a plurality of gate keeper components 119 that mediate OPS communications among OPS components. A Horizon gate keeper 119A links the Horizon OPS component 110 to the network 108, a Keystone gate keeper 119B links the Keystone OPS component 112 to the network 108, a Glance gate keeper 119C links the Glance OPS component 114 to the network 108, a Neutron gate keeper 119D links the Neutron OPS component 116 to the network 108, a Cinder gate keeper 119E links the Cinder OPS component 118 to the network 108, and a Nova agent gate keeper 119F links each Nova agent OPS component 120 to the network 108. One or more of the gate keepers 119 may be implemented as plug-ins that are encapsulated or dynamically linked into its respective OPS component. Each of the gate keeper components 119A, 119B, 119C, 119D, and 119E may execute on the same computer system as its associated OPS component executes.

In an alternative cloud computing framework, the Horizon gate keeper 119A may be substituted by a controller gate keeper component, the Keystone gate keeper 119B may be substituted by an identity management gate keeper component, the Glance gate keeper 119C by be substituted by an executable image management gate keeper component, the Neutron gate keeper 119D may be substituted by a communication gate keeper component, the Cinder gate keeper 119E may be substituted by a block storage management gate keeper component, and the Nova agent gate keeper 119F may be substituted by an agent gate keeper component. The secure cloud computing framework may be said to also comprise the controller gate keeper component, the identity management gate keeper component, the executable image management gate keeper component, the communication gate keeper component, the block storage management gate keeper component and the agent gate keeper component(s).

The secure OPS framework 140 further comprises the security engine 122 and a security data store 124. The system 100 further comprises an orchestrator 126 that may be viewed as part of the secure OPS framework 140 or as outside of the secure OPS framework 140 and tasked with mediating between a plurality of secure OPS frameworks 140, as discussed further with reference to FIG. 2 below. The secure OPS framework 140 can be considered to incorporate a single OPS cluster.

The gate keepers 119 may be said to implement an abstract security communication bus in the secure OPS framework 140. Communications among components of the OpenStack cluster are mediated by the gate keepers 119 which provide security oversight for these OpenStack communications. In an embodiment, the gate keepers 119 may encrypt OPS messages that pass between the gate keepers 119. For example, the Horizon OPS component 110 may send an OPS message to the Nova agent OPS component 120 via the Horizon gate keeper 119A. The Horizon gate keeper 119A may encrypt the OPS message and send the encrypted OPS message via the network 108 to the Nova agent gate keeper 119F. The Nova agent gate keeper 119F may decrypt the encrypted OPS message and provide the original OPS message to the Nova agent OPS component 120.

The gate keepers 119 may be configured with encryption keys by the security engine 122. Each gate keeper 119 may be associated with a different encryption key. Thus, a first gate keeper 119 encrypting a first OPS message to send to a second gate keeper 119 would encrypt the first OPS message with an encryption key assigned to the second gate keeper 119; the first gate keeper encrypting a second OPS message to send to a third gate keeper 119 would encrypt the second OPS message with a different encryption key that is assigned to the third gate keeper 119. The security engine 122 may periodically or on occurrence of a triggering event send new encryption keys to the gate keepers 119.

The security engine 122 may configure security rules into the gate keepers 119 that they use to perform security functions. The security rules configured into a first gate keeper 119 may be different from the security rules configured into a second gate keeper 119. Said in other words, the security rules configured into the gate keepers 119 may be distinctive to the OPS component that the gate keepers 119 are associated to.

The security engine 122 may analyze OPS messages that gate keepers 119 log to the security data store 124 to determine statistical norms of OPS message traffic. At least some of the security rules configured by the security engine 122 into the gate keepers 119 may specify a threshold of OPS message traffic that triggers a security action by the gate keeper. For example, OPS message traffic transmitted by the Keystone OPS component 112 above a threshold may trigger the Keystone gate keeper 112 to allow the OPS message traffic but send a notification to the security engine 122 for evaluation of the security state. Alternatively, the Keystone gate keeper 112 in this circumstance may disallow the OPS message traffic and send a notification of this action to the security engine 122 and/or to the orchestrator for evaluation. The threshold may be defined in a percentage above or below a norm value of OPS message traffic.

Some security rules generated by the security engine 122 and configured into gate keepers 119 may identify black listed IP addresses that the subject OPS component is debarred from sending OPS messages to or receiving OPS messages from. Alternatively, some security rules generated by the security engine 122 can configured into gate keepers 119 may restrict specific gate keepers from sending a message to another specific gate keeper or may restrict specific gate keepers from receiving a message from another specific gate keeper. Some security rules may be enforced by the security engine 122 upon all OPS components and/or gate keepers which may be referred to as global security rules.

The security engine 122 communicates with the orchestrator 126 to share security rules that it generates and to share at least some OPS message logs stored in the security data store 124. The orchestrator 126 may evaluate whether a security rule generated by a security engine 122 in a first OPS cluster is generalizable to other OPS clusters. The statements about OPS clusters above may also apply in a similar way to clusters of a different cloud computing framework.

Figure 2:
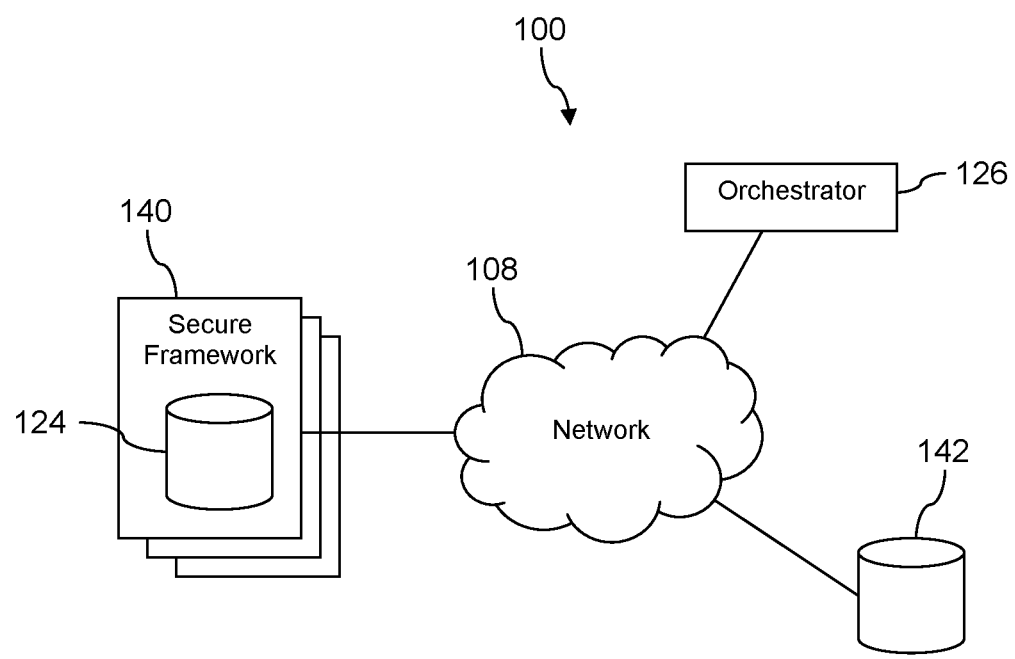
FIG. 2 is a block diagram of a computing environment according to another embodiment of the disclosure.

Turning now to FIG. 2, another view of the system 100 is described. In an embodiment, the system 100 comprises a plurality of OPS clusters, where each OPS cluster is contained within an instance of the secure OPS framework 140. The orchestrator 126 communicates via the network 108 with a plurality of secure OPS frameworks 140 and stores messages and security rules forwarded to it from the secure OPS frameworks 140 (e.g., from security engines 122 within those secure OPS frameworks 140) in a global security data store 142. In some contexts, the global security data store 142 may be referred to as a cross-cluster security data store. The orchestrator 126 reviews security rules shared by security engines 122 to determine which, if any, of these security rules may be globally applicable to all secure OPS frameworks 140. In the case a security rule generated by one security engine 122 is deemed globally applicable, the orchestrator 126 may promulgate the security rule to other security engines 122 in other secure OPS frameworks 140, and those other security engines 122 may configure the subject security rule into one or more gate keepers 119 accordingly. In this way, a security attack or risk that is identified in a first secure OPS framework 140 may be shared with other secure OPS frameworks 140, whereby to spare these other secure OPS frameworks 140 the pain of experiencing a security fault or cyberattack themselves before implementing a counter measure against it. The orchestrator 126 may itself create new security rules based on its analysis of OPS data collected from a plurality of secure OPS frameworks 140 and promulgate those new security rules to the security engines 122. It is understood that the teachings with reference to FIG. 2 apply as well to a secure cloud computing framework that does not use an OPS cloud computing environment.

Figure 3:
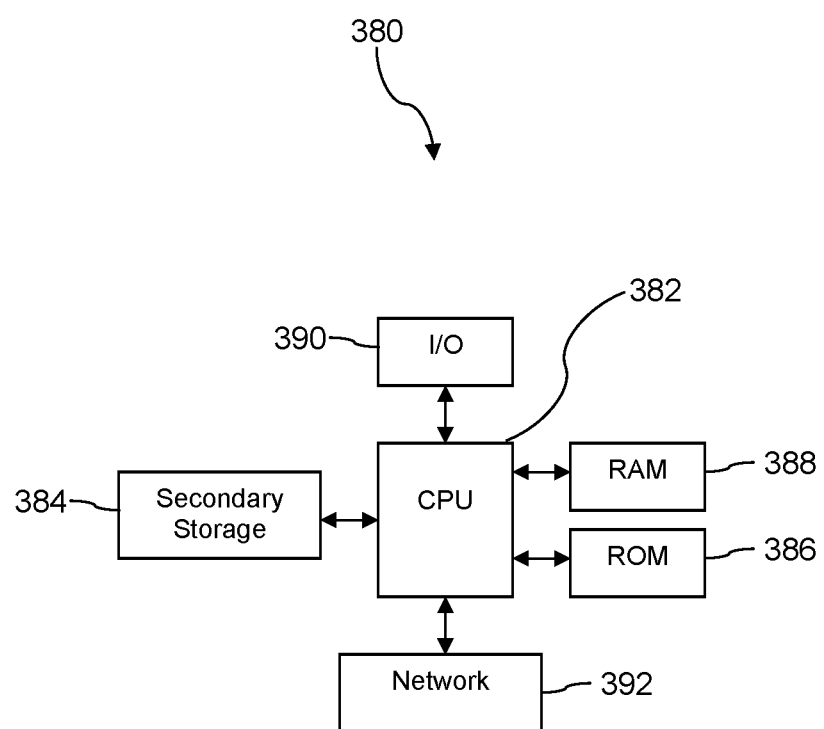
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A cloud computing system, comprising:
    a communication network;
    a security data store communicatively coupled to the communication network;
    a plurality of compute nodes, at least some of the compute nodes comprising a cloud computing framework agent coupled to an agent gate keeper component, where the cloud computing framework agent communicates with the communication network via the agent gate keeper component;
    a cloud computing framework controller component coupled to a controller gate keeper component, where the cloud computing framework controller component controls compute instances instantiated on the compute nodes and communicates with the communication network via the controller gate keeper component;
    a cloud computing framework executable image management component coupled to an executable image management gate keeper component, where the cloud computing framework executable image management component manages images that execute in the compute instances on the compute nodes and communicates with the communication network via the executable image management gate keeper component; and
    a security engine coupled to the communication network that receives messages from the controller gate keeper component containing logs of activity of the cloud computing framework controller component, receives messages from the executable image management gate keeper component containing logs of activity of the cloud computing framework executable image management component, receives messages from the agent gate keeper components containing logs of activity of the cloud computing framework agents, stores the messages from the controller gate keeper component, the executable image management gate keeper, and the agent gate keeper components in the security data store, analyzes the messages received from the controller gate keeper component, the executable image management gate keeper component, and the agent gate keeper components, sends a security command to one of the controller gate keeper component, the executable image management gate keeper component, or at least one of the agent gate keeper components to take a security action, determines norms of cloud computing framework message traffic based on analyzing the messages received from the controller gate keeper component, the executable image management gate keeper, and the agent gate keeper components, determines a security rule based on the norms of cloud computing framework message traffic, and transmits the security rule to the controller gate keeper component, wherein the controller gate keeper component configures itself with the security rule and applies the security rule to cloud computing framework messages that the controller gate keeper component processes.

2. The system of claim 1, wherein the security engine determines a second security rule based on the norms of cloud computing framework message traffic and transmits the second security rule to the agent gate keeper component, wherein the agent gate keeper component configures itself with the second security rule and applies the second security rule to cloud computing framework messages that the agent gate keeper component processes.

3. The system of claim 1, wherein the agent gate keeper component, the controller gate keeper component, and the executable image management gate keeper component constitute a security communication bus within the system.

4. The system of claim 3, wherein each cloud computing framework message of a plurality of cloud computing framework messages exchanged over the security communication bus is encrypted by one of the controller gate keeper component, the executable image management gate keeper component, and the agent gate keeper component that transmits the cloud computing framework message onto the security communication bus and is decrypted by one of the controller gate keeper component, the executable image management gate keeper component, and the agent gate keeper component that receives the cloud computing framework message from the security communication bus.

5. The system of claim 1, further comprising:
    a cloud computing framework identity management component coupled to an identify management gate keeper component, where the cloud computing framework identity management component provides an identity management facility and communicates with the communication network via the identity management gate keeper component; and
    a cloud computing framework communication component coupled to a communication gate keeper component, where the cloud computing framework communication component provides a switching and routing facility and communicates with the communication network via the communication gate keeper component.

6. The system of claim 5, further comprising a cloud computing framework block storage management component coupled to a block storage management gate keeper component, where the cloud computing framework block storage management component provides a block storage management facility and communicates with the communication network via the block storage management gate keeper component.

7. The system of claim 1, wherein each of the agent gate keeper component, the controller gate keeper component, and the executable image management gate keeper component is operable to receive and process a cloud computing framework message received via the communication network from a cloud computing framework component that is not coupled to a gate keeper component, whereby a security cloud computing framework implemented by the agent gate keeper component, the controller gate keeper component, the executable image management gate keeper component, and the security engine is transparent to a cloud computing framework component that is not integrated with the security engine.

8. The system of claim 1, wherein the security engine further receives a request from the controller gate keeper component to initiate an image on a compute instance, analyzes the image to determine an authentication metric, compares the authentication metric to a validated authentication value, and when the authentication metric matches the validated authentication value, sends the image to the cloud computing framework executable image management component for loading and instantiating in the compute instance.

9. The system of claim 8, wherein the image is an executable image that comprises one or more computer program or computer script.

10. The system of claim 1, further comprising:
an orchestrator coupled to the communication network that analyzes data on cloud computing framework messages stored in a cross-cluster security data store, generates at least one general security rule based on analyzing the data in the cross-cluster security data store, and transmits the general security rule to a plurality of security engines in a plurality of cloud computing clusters including the security engine.

11. A cloud computing method, comprising:
receiving, by a security engine coupled to a communication network, messages from a controller gate keeper component containing logs of activity of a cloud computing framework controller component that is coupled to the controller gate keeper component, wherein the cloud computing framework controller component controls compute instances instantiated on compute nodes and communicates with the communication network via the controller gate keeper component;
receiving, by the security engine, messages from an executable image management gate keeper component containing logs of activity of a cloud computing framework executable image management component that is coupled to the executable image management gate keeper component, wherein the cloud computing framework executable image management component manages images that execute in the compute instances on the compute nodes and communicates with the communication network via the executable image management gate keeper component;
receiving, by the security engine, messages from agent gate keeper components containing logs of activity of cloud computing framework agents that are included in at least some of the compute nodes and coupled to the agent gate keeper components, wherein each of the cloud computing framework agents communicate with the communication network via a corresponding agent gate keeper;
storing, by the security engine, the messages received from the controller gate keeper component, the executable image management gate keeper, and the agent gate keeper components in a security data store coupled to the communication network;
analyzing, by the security engine, the messages received from the controller gate keeper component, the executable image management gate keeper, and the agent gate keeper components,
sending, by the security engine, a security command to one of the controller gate keeper component, the executable image management gate keeper component, or one of the agent gate keeper components to take a security action;
determining, by the security engine, norms of cloud computing framework message traffic based on analyzing the messages received from the controller gate keeper component, the executable image management gate keeper, and the agent gate keeper components;
determining, by the security engine, a security rule based on the norms of cloud computing framework message traffic; and
transmitting, by the security engine, the security rule to at least one agent gate keeper component, wherein the at least one agent gate keeper component configures itself with the security rule and applies the security rule to cloud computing framework messages that the at least one agent gate keeper component processes.

12. The system of claim 11, further comprising:
determining, by the security engine, a second security rule based on the norms of cloud computing framework message traffic; and
transmitting, by the security engine, the second security rule to the controller gate keeper component, wherein the controller gate keeper component configures itself with the second security rule and applies the second security rule to cloud computing framework messages that the controller gate keeper component processes.

13. The method of claim 11, wherein the agent gate keeper components, the controller gate keeper component, and the executable image management gate keeper component constitute a security communication bus within a cloud computing system, wherein each cloud computing framework message of a plurality of cloud computing framework messages exchanged over the security communication bus is encrypted by one of the controller gate keeper component, the executable image management gate keeper component, and one of the agent gate keeper components that transmits the cloud computing framework message onto the security communication bus and is decrypted by one of the controller gate keeper component, the executable image management gate keeper component, and one of the agent gate keeper components that receives the cloud computing framework message from the security communication bus.

14. The method of claim 11, wherein each of the agent gate keeper components, the controller gate keeper component, and the executable image management gate keeper component is operable to receive and process a cloud computing framework message received via the communication network from a cloud computing framework component that is not coupled to one of the agent gate keeper components, whereby a security cloud computing framework implemented by the agent gate keeper components, the controller gate keeper component, the executable image management gate keeper component, and the security engine is transparent to a cloud computing framework component that is not integrated with the security engine.

15. The method of claim 11, further comprising:
receiving, by the security agent, a request from the controller gate keeper component to initiate an image on a compute instance;
analyzing, by the security agent, the image to determine an authentication metric;
comparing, by the security agent, the authentication metric to a validated authentication value; and
when the authentication metric matches the validated authentication value, sending, by the security agent, the image to the cloud computing framework executable image management component for loading and instantiating in the compute instance.

16. The method of claim 11, further comprising:
analyzing, by an orchestrator coupled to the communication network, data on cloud computing framework messages stored in a cross-cluster security data store;
generating, by the orchestrator, at least one general security rule based on analyzing the data in the cross-cluster security data store; and
transmitting, by the orchestrator, the general security rule to a plurality of security engines in a plurality of cloud computing clusters including the security engine.

* * * * *